United States Patent
Wang He

(10) Patent No.: US 8,845,175 B2
(45) Date of Patent: Sep. 30, 2014

(54) LIGHT GUIDE PLATE HAVING UNIFORM LIGHT EMISSION AND BACKLIGHT MODULE

(71) Applicant: Hon Hai Precision Industry Co., Ltd., New Taipei (TW)

(72) Inventor: Li-Ying Wang He, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/864,296

(22) Filed: Apr. 17, 2013

(65) Prior Publication Data
US 2014/0177276 A1     Jun. 26, 2014

(30) Foreign Application Priority Data
Dec. 26, 2012  (TW) ............................... 101150015 A

(51) Int. Cl.
*F21V 7/04*  (2006.01)
*F21V 8/00*  (2006.01)

(52) U.S. Cl.
CPC ................................... *G02B 6/0035* (2013.01)
USPC .......................................... 362/625; 362/623

(58) Field of Classification Search
CPC .... G02B 6/004; G02B 6/0043; G02B 6/0011; G02B 6/0033; G02B 6/0035; G02B 6/0036; G02B 6/0038; G02B 6/0058; G02B 6/0061; F21V 7/04
USPC ......... 362/600, 602, 603, 612, 613, 615, 623, 362/624, 625, 627
See application file for complete search history.

(56) References Cited

U.S. PATENT DOCUMENTS

| | | | | |
|---|---|---|---|---|
| 5,775,791 A | * | 7/1998 | Yoshikawa et al. | 362/625 |
| 2007/0291510 A1 | * | 12/2007 | Chen | 362/618 |
| 2010/0142224 A1 | * | 6/2010 | Zhang et al. | 362/615 |
| 2013/0121028 A1 | * | 5/2013 | Wang He | 362/621 |

* cited by examiner

*Primary Examiner* — Thomas Sember
(74) *Attorney, Agent, or Firm* — Novak Druce Connolly Bove + Quigg LLP

(57) ABSTRACT

A light guide plate includes a light emitting surface, a bottom surface opposite to the light emitting surface, a light incident surface, and a side surface opposite to the light incident surface. The bottom surface is imaginarily divided into a plurality of rectangular portions along a direction from the light incident surface to the side surface. The shapes of the rectangular portions are the same as each other. Each of the rectangular portions distributes a plurality of microstructures. The rectangular portions are assigned serial numbers along the direction from the light incident surface to the side surface. The microstructure density in each of the rectangular portions between the first rectangular portion and the last rectangular portion satisfies the formula: $a_i=(a_{i-1}+a_i+a_{i+1})/3$, where i represents the serial number of the rectangular portion, N represents the total number of the rectangular portions, $1<i<N$, and i and N are natural numbers.

10 Claims, 1 Drawing Sheet

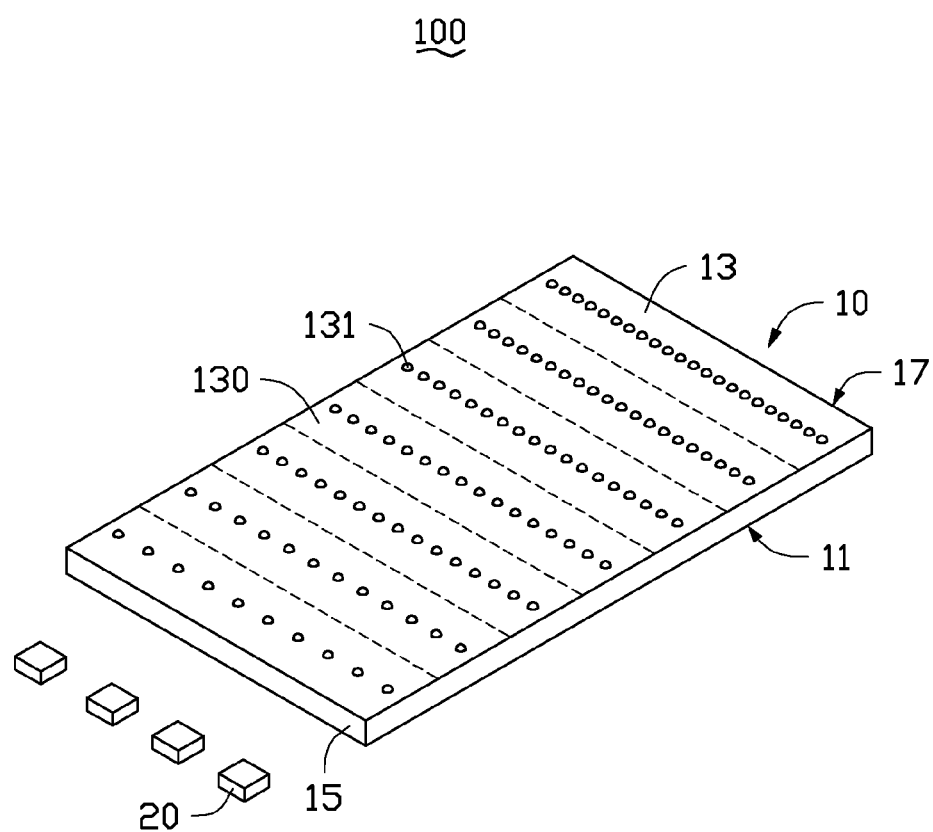

LIGHT GUIDE PLATE HAVING UNIFORM LIGHT EMISSION AND BACKLIGHT MODULE

BACKGROUND

1. Technical Field

The present disclosure relates to a light guide plate having uniform light emission and a backlight module.

2. Description of Related Art

Light guide plates are often used to expand a number of point light sources to an area light source. A typical light guide plate includes a light emitting surface, a light incident surface perpendicular to the light emitting surface, a bottom surface opposite to the light emitting surface, and a side surface opposite to the light incident surface. The light source is positioned on one side of the light incident surface. Because there is a long distance between the light incident surface and the side surface, the light rays from the light sources will be reduced or lost during transmission, therefore, the brightness of an end of the light emitting surface adjacent to the side surface is less than the brightness of the other end of the light emitting surface adjacent to the light incident surface. That is, the overall brightness of the light emitting surface is not uniform.

Therefore, it is desirable to provide a light guide plate and a backlight module that can overcome the above-mentioned limitations.

BRIEF DESCRIPTION OF THE DRAWINGS

Many aspects of the embodiments should be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

The FIGURE is a schematic view of a backlight module, according to an exemplary embodiment.

DETAILED DESCRIPTION

The FIGURE illustrates a backlight module 100 in accordance with an embodiment. The backlight module 100 includes a light guide plate 10 and a number of light sources 20.

The light guide plate 10 is made of transparent material (such as acrylic resin or polyethylene resin), and includes a light emitting surface 11, a bottom surface 13, a light incident surface 15, and a side surface 17. The bottom surface 13 is opposite to and substantially parallel to the light emitting surface 11. The light incident surface 15 is connected to the light emitting surface 11 and the bottom surface 13. The light incident surface 15 is substantially perpendicular to the light emitting surface 11. The side surface 17 is connected to the light emitting surface 11 and the bottom surface 13, and faces away from the light incident surface 15. In other embodiments, the bottom surface 13 can be inclined with respect to the light emitting surface 15.

The light sources 20 face the light incident surface 15. The light incident surface 15 transmits light rays from the light sources 20 into the light guide plate 10. The bottom surface 13 and the side surface 17 internally reflect the light rays in the light guide plate 10, respectively. The light emitting surface 11 transmits a portion of the light rays incident thereon to the exterior above the light guide plate 10, and reflects the other portion of the light rays incident thereon back into the light guide plate 10.

The bottom surface 13 is imaginarily divided into a number of rectangular portions 130 along a direction from the light incident surface 15 to the side surface 17. The rectangular portions 131 are continuously and uniformly distributed. The shapes of the rectangular portions 130 are substantially the same as each other, and the areas of the rectangular portions 130 are substantially the same as each other.

The lengthwise direction of each of the rectangular portions 131 is parallel to the light incident surface 15. Each of the rectangular portions 130 uniformly distributes a number of micro structures 131.

The rectangular portions 130 are assigned to serial numbers along a direction from the light incident surface 15 to the side surface 17, and thus each of the rectangular portions 130 has an assigned serial number. The micro structure densities of the rectangular portions 130 gradually increase when the serial numbers of the rectangular portions 130 gradually increase.

The microstructure density in the rectangular portions 130 between the first rectangular portion 130 and the last rectangular portion 130 satisfies the formula: $a_i=(a_{i-1}+a_i+a_{i+1})/3$, wherein i represents the serial number of the rectangular portion, N represents the total number of the rectangular portion, $1<i<N$, and i and N are natural numbers.

The microstructures 131 in each of the rectangular portions 130 are uniformly distributed. In the embodiment, the microstructures 131 in each of the rectangular portions 130 are arranged in a line, and thus to form a number of lines parallel to each other.

In the embodiment, the microstructures 131 are formed by an ejection molding method, and can be hemispherical micro protrusions, cylindrical micro protrusions, or cubic micro protrusions. In other embodiments, the microstructures 131 also can be formed by a laser manufacturing method, and can be hemispherical micro recesses, cylindrical micro recesses, or cubic micro recesses.

Because the microstructure density of the rectangular portions 130 adjacent to the side surface 17 is greater than the microstructure density of the rectangular portions 130 adjacent to the light incident surface 15, thus the light rays can be reflected and diffused more times adjacent to the side surface 17 and the brightness of the light emitting surface 13 adjacent to the side surface 17 can be effectively improved, The overall brightness of the light emitting surface 13 is distributed uniformly.

It will be understood that the above particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A light guide plate made of transparent material, and comprising:

a light emitting surface;

a bottom surface opposite to the light emitting surface;

a light incident surface; and a side surface opposite to the light incident surface;

wherein the entire bottom surface is imaginarily divided into a plurality of rectangular portions along a direction from the light incident surface to the side surface, the shapes of the rectangular portions are the same as each other, the areas of the rectangular portions are the same as each other, each of the rectangular portions comprises a plurality of microstructures, the rectangular portions are assigned serial numbers along the direction from the light incident surface to the side surface, the microstructure densities of the rectangular portions increase when the serial numbers of the rectangular portions increase, the microstructure density in each of the rectangular portions between the first rectangular portion and the last rectangular portion satisfies the following formula: $a=(a_{i-1}+a_i+a_{i+1})/3$, where i represents the serial number of the rectangular portion, N represents the total number of the rectangular portions, $1<i<N$, and i and N are natural numbers.

2. The light guide plate of claim 1, wherein the light incident surface is substantially perpendicular to the light emitting surface.

3. The light guide plate of claim 1, wherein the micro structures are hemispherical micro protrusions, cylindrical micro protrusions, or cubic micro protrusions.

4. The light guide plate of claim 1, wherein the micro structures are hemispherical micro recesses, cylindrical micro recesses, or cubic micro recesses.

5. The light guide plate of claim 1, wherein the microstructures in each of the rectangular portions are arranged in a line substantially parallel to the light incident surface.

6. A backlight module, comprising:
   a light guide plate made of transparent material, and comprising:
   a light emitting surface;
   a bottom surface opposite to the light emitting surface;
   a light incident surface; and
   a side surface opposite to the light incident surface;
   wherein the entire bottom surface is imaginarily divided into a plurality of rectangular portions along a direction from the light incident surface to the side surface, the shapes of the rectangular portions are the same as each other, the areas of the rectangular portions are the same as each other, each of the rectangular portions comprises a plurality of microstructures, the rectangular portions are assigned serial numbers along the direction from the light incident surface to the side surface, the microstructure densities of the rectangular portions increase when the serial numbers of the rectangular portions increase, the microstructure density in each of the rectangular portions between the first rectangular portion and the last rectangular portion satisfies the formula: $a_i=(a_{i-1}+a_i+a_{i+1})/3$, where i represents the serial number of the rectangular portion, N represents the total number of the rectangular portions, $1<i<N$, and i and N are natural numbers, and
   at least one light source facing the light incident surface.

7. The backlight module of claim 6, wherein the light incident surface is substantially perpendicular to the light emitting surface.

8. The backlight module of claim 6, wherein the micro structures are hemispherical micro protrusions, cylindrical micro protrusions, or cubic micro protrusions.

9. The backlight module of claim 6, wherein the micro structures are hemispherical micro recesses, cylindrical micro recesses, or cubic micro recesses.

10. The backlight module of claim 6, wherein the microstructures in each of the rectangular portions are arranged in a line substantially parallel to the light incident surface.

* * * * *